United States Patent [19]
Ragard et al.
[11] 3,859,707
[45] Jan. 14, 1975

[54] ELECTRONIC COMPONENT SEMI-AUTOMATIC ASSEMBLY MACHINE

[75] Inventors: Phillip A. Ragard, Binghamton; James W. Paton, Johnson City, both of N.Y.

[73] Assignee: Universal Instruments Corporation, Binghamton, N.Y.

[22] Filed: Oct. 30, 1973

[21] Appl. No.: 411,044

[52] U.S. Cl. .............................................. 29/203 B
[51] Int. Cl. .......................................... H05k 13/04
[58] Field of Search .......... 29/203 B, 203 D, 203 R, 29/203 P, 626, 33 M; 227/2

[56] References Cited

UNITED STATES PATENTS 3,539,086 11/1970 Ragard et al. ........................ 227/2
3,545,064 12/1970 Zemek et al. .................... 29/203 B
3,636,624 1/1972 Bates ................................ 29/203 B

*Primary Examiner*—Thomas H. Eager
*Attorney, Agent, or Firm*—Fidelman, Wolffe, Leitner & Hiney

[57] ABSTRACT

A semi-automatic assembly machine for manually inserted electronic components having a control for positioning the workpiece, identifying the component to be used from a plurality of component bins, and indicating the location on the workpiece where the component is to be inserted and its proper orientation. After the manual insertion of the component into the workpiece, a hold-down assembly secures the component to the workpiece and a control is activated to automatically cut and clinch the component lead ends.

22 Claims, 21 Drawing Figures

PATENTED JAN 14 1975

3,859,707

ELECTRONIC COMPONENT SEMI-AUTOMATIC ASSEMBLY MACHINE

BACKGROUND OF THE INVENTION

1. Field of the Invention

The present invention relates generally to an electronic component assembly machine and more specifically to a semi-automatic assembly machine wherein the components are manually inserted and automatically cut and clinched.

2. Description of the Prior Art

In the field of electronic component assembly machines, there are a multitude of fully automatic electronic component assembly machines. These machines generally select an electronic component from a plurality of supplies or use a pre-sequenced taped supply and automatically insert the electrical components into a workpiece. The electronic components are then automatically cut and clinched to complete the assembly operation.

A typical example of a variable sized modular sequence and inserting apparatus is disclosed in U.S. Pat. No. 3,545,064. A multisized variable center electronic component insertion machine is disclosed in U.S. Pat. No. 3,539,086, which includes cutting and clinching of the leads. A transistor inserting apparatus is disclosed in U.S. PAT. No. 3,636,624.

The above patents are samples of the prior art which generally disclose automatic insertion heads for inserting a variety of components. In spite of the multitude of prior art devices which insert a variety of components, a need still exists for a machine which will aid in the assembly of a circuit board requiring manual insertion of components having odd sizes and shapes. In industry, printed circuit boards will generally go through one of the above-mentioned apparatus for insertion of regular sized components, such as resistors, transistors, etc. These boards can only be partially completed by automatic apparatus, and requiring the manual insertion of odd-sized components.

To meet this need, devices have been developed which display the location of hand insertable components. These programmed devices are fairly complicated and expensive. Also, these devices do not provide an automatic cut and clinch subassembly; instead they require the removal of the board and hand cutting and clinching.

SUMMARY OF THE INVENTION

The present invention is a manual assembly machine for electronic components having a mini-computer control for positioning the printed circuit board, identifying the component to be used from a plurality of component bins, and indicating the location on the circuit board where the component is to be inserted and its proper orientation. After the manual insertion of the component into the workpiece, a hold-down assembly secures the component to the workpiece and a control is activated to automatically cut and clinch the component lead ends.

OBJECTS OF THE INVENTION

It is an object of the present invention to provide a semi-automatic machine which will cut and clinch manually inserted electronic components.

Another object is to provide an economical projection system for indicating the position and orientation of an electronic component to be manually inserted.

A further object of the invention is to provide a stationary projection system with a work table movable in an X–Y and rotational direction to position the workpiece relative to the projection system.

Still another object of the invention is to provide a projection, component hold-down and cut and clinch mechanism which are stationary while the workpiece is moved relative thereto.

A still further object of the present invention is to provide an automatic system which positions the workpiece, indicates location and orientation of the component to be inserted, indicates the source from which the component is to be selected and automatically cuts and clinches the inserted electronic component.

Other objects, advantages and novel features of the present invention will become apparent from the following detailed description of the invention when considered in conjunction with the accompanying drawings.

DESCRIPTION OF THE PREFERRED EMBODIMENTS

Figures 1, 16, 18:
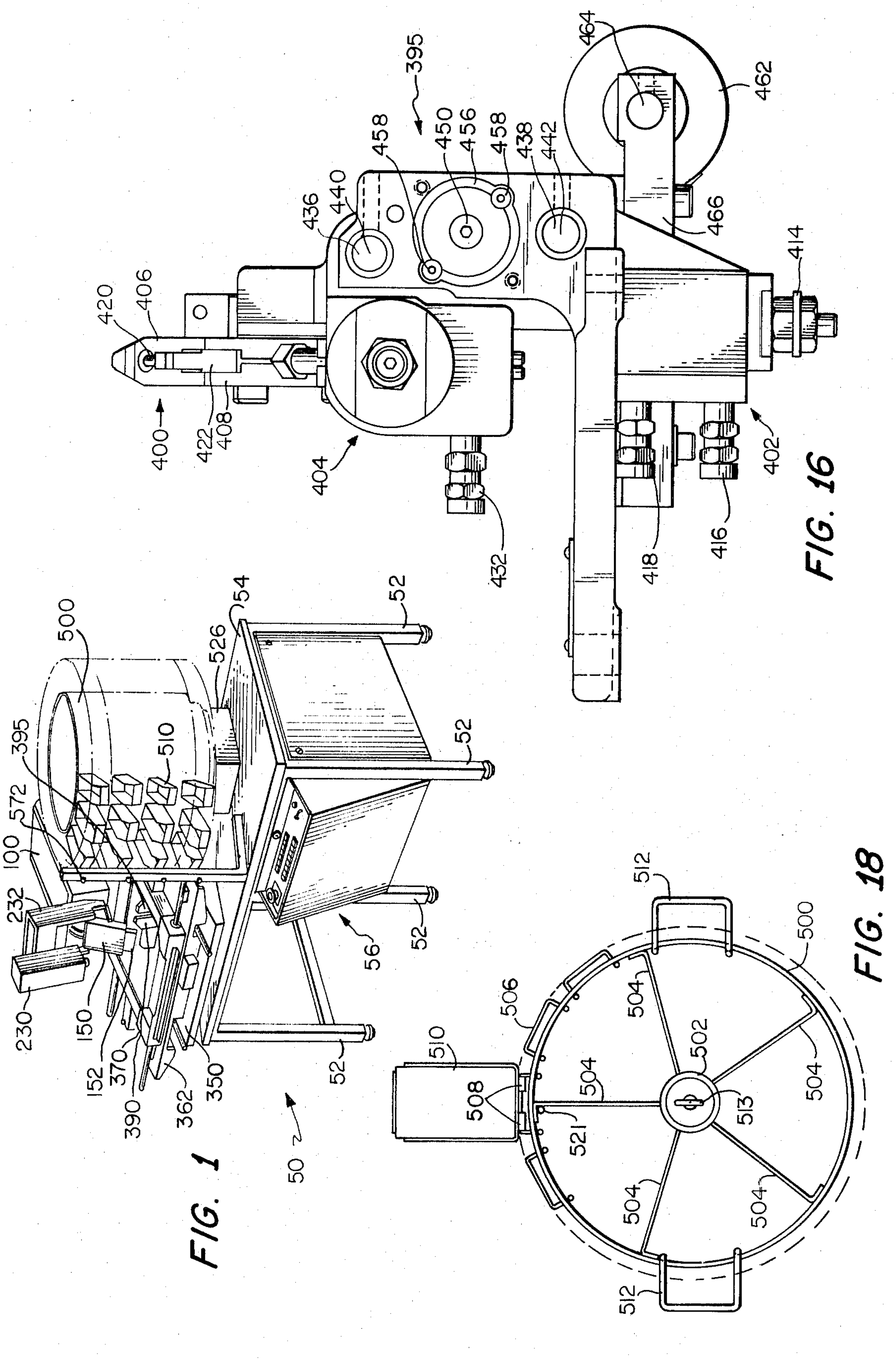
FIG. 1 is a perspective view of a preferred embodiment of the present invention.
FIG. 16 is a right-side view of the cut and clinch assembly.
FIG. 18 is a top view of the component carousel.

As illustrated in FIG. 1, the semi-automatic electronic component assembly machine of the present invention comprises console 50 having legs 52 and table top 54. On the right side of the console is illustrated graphically the control panel 56, which includes electronic and pneumatic controls and, in a preferred embodiment, a mini-computer. Secured to the table top 54 is support frame 100 which supports a projector unit 230 and the drive mechanisms for a component hold-down assembly which is graphically shown as having an air cylinder 150 and metal leads 152. Directly under the projection unit 230 and hold-down assembly are positioning support 350 having the X carriage 362 and the Y carriage 370 mounted for orthogonal movement thereon. Not shown, but as will be discussed later, a rotary worktable is positioned upon the X axis carriage 370. Below the X and Y positioning system are cut and clinch left and right halves 390 and 395, respectively. To the right of the projection, hold-down, positioning and cut and clinch assemblies, is a tiered carousel 500 having part pins 510 thereon. The carousel tiers 500 rest upon bin drive housing 526. Indicators 572 are also mounted to table top 54.

The operation of the present device starts with the positioning of the workpiece below the projection and hold-down assemblies. The carousel tiers 500 and bins 510 thereon are rotated to position one column of bins 510 opposite indicators 572. One of the indicators 572 is activated opposite bin 510 to show which bin the next electrical component to be manually inserted is to be taken from. The operator removes the electrical component and inserts it into the workpiece in the position and orientation indicated by projector 230. The hold-down assembly is lowered with leaves 152 surrounding and holding the component close to the workpiece. The cut and clinch assembly is raised to engage the leads extending through the workpiece and cuts and clinches them. Upon completion of the cutting and clinching, the cut and clinch assembly is lowered, the hold-down assembly is raised, and the X–Y table is moved to the next position, starting the cycle over again.

The assembly as just discussed will be explained in detail hereafter:

SUPPORT FRAME

Figures 5, 21:
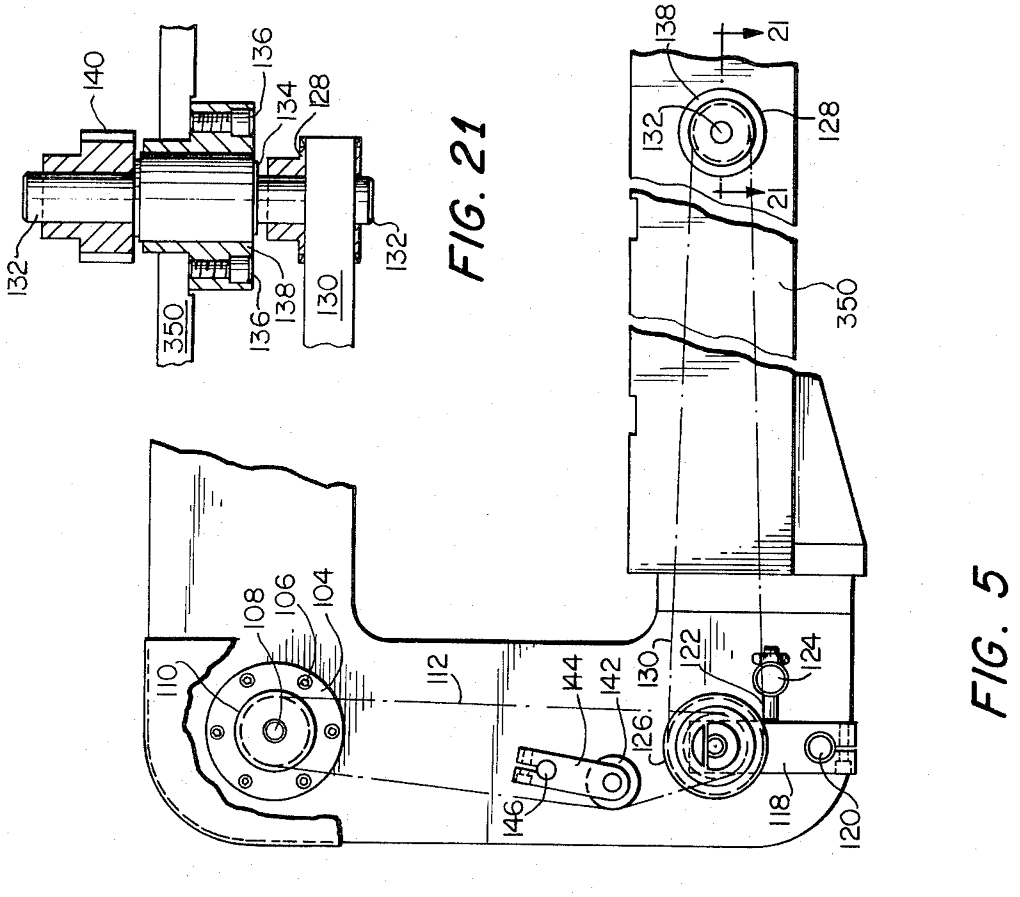
FIG. 5 is a left-side view of the cut and clinch adjustment drive assembly.
FIG. 21 is a sectional view taken along lines 21—21 of FIG. 5.
Figure 4:
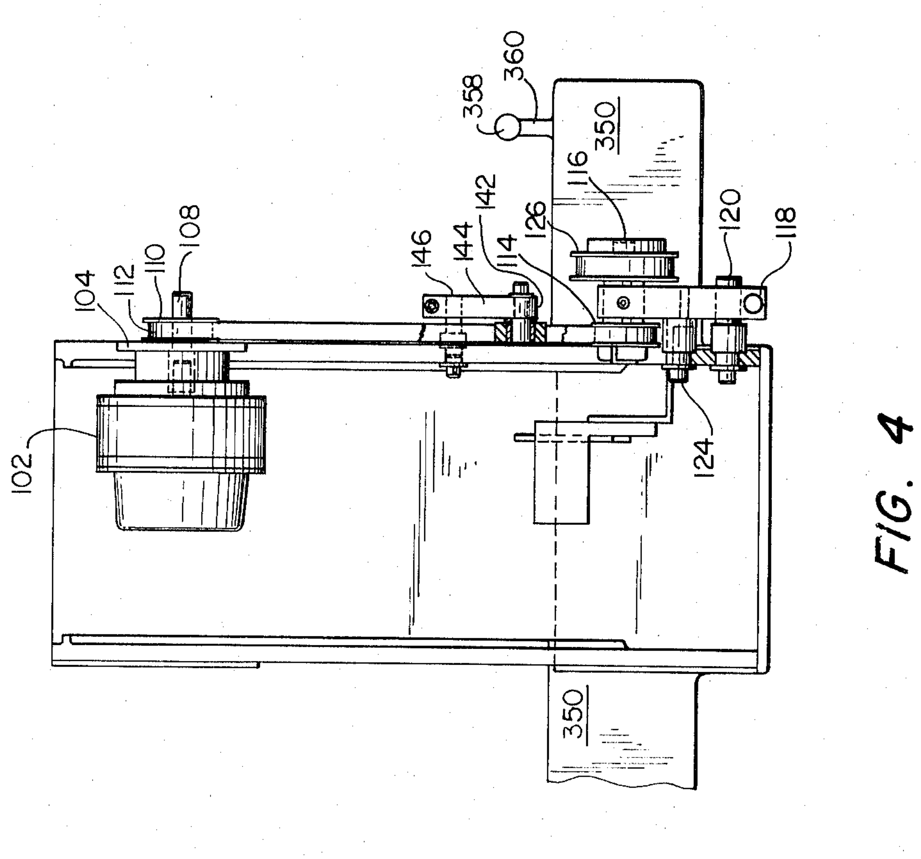
FIG. 4 is a rear view of the cut and clinch adjustment drive assembly.

The support frame 100 provides a mounting surface for a work lamp (not shown), component hold-down assembly and indicator projector. A motor 102 at the rear of support frame drives a series of geared belts and geared pulleys and is used to adjust the center distance of the cut and clinch assembly. As shown in FIGS. 4 and 5, the motor 102 is secured to the support frame by a bracket 104 and fasteners 106. A drive shaft 108 extends through the support frame 100 and has a pulley 110 secured thereon. A belt 112 connects pulley 110 and a pulley 114 secured to a shaft 116. A bracket 118 is adjustably mounted to a post 120 which is secured to support frame 100. An adjustable pin 122 is mounted to the support frame 100 by a post 124 and abuts the side of bracket 118 to prevent movement of the bracket after adjustment thereof.

Also mounted to shaft 116, on the other side of bracket 118, is a pulley 126 which is connected to a pulley 128 by a belt 130. The setting of pin 122 adjusts the tension on belt 130. The pulley 128, as shown in detail in FIG. 21, is secured to a shaft 132 which is supported by a sleeve bearing 124 journalled in and secured to the X–Y positioning support 350 by fasteners 136 and bracket 138. On the other end of shaft 132 is a gear 140 which drives a belt (not shown). The belt connects shaft 132 and the adjustment mechanism of the cut and clinch assembly (to be described in detail later). A tension roller 142 and a bracket 144 are adjustably mounted to the support frame 100 by a post 146 to maintain proper tension on belt 112.

COMPONENT HOLD-DOWN ASSEMBLY

Figure 6:
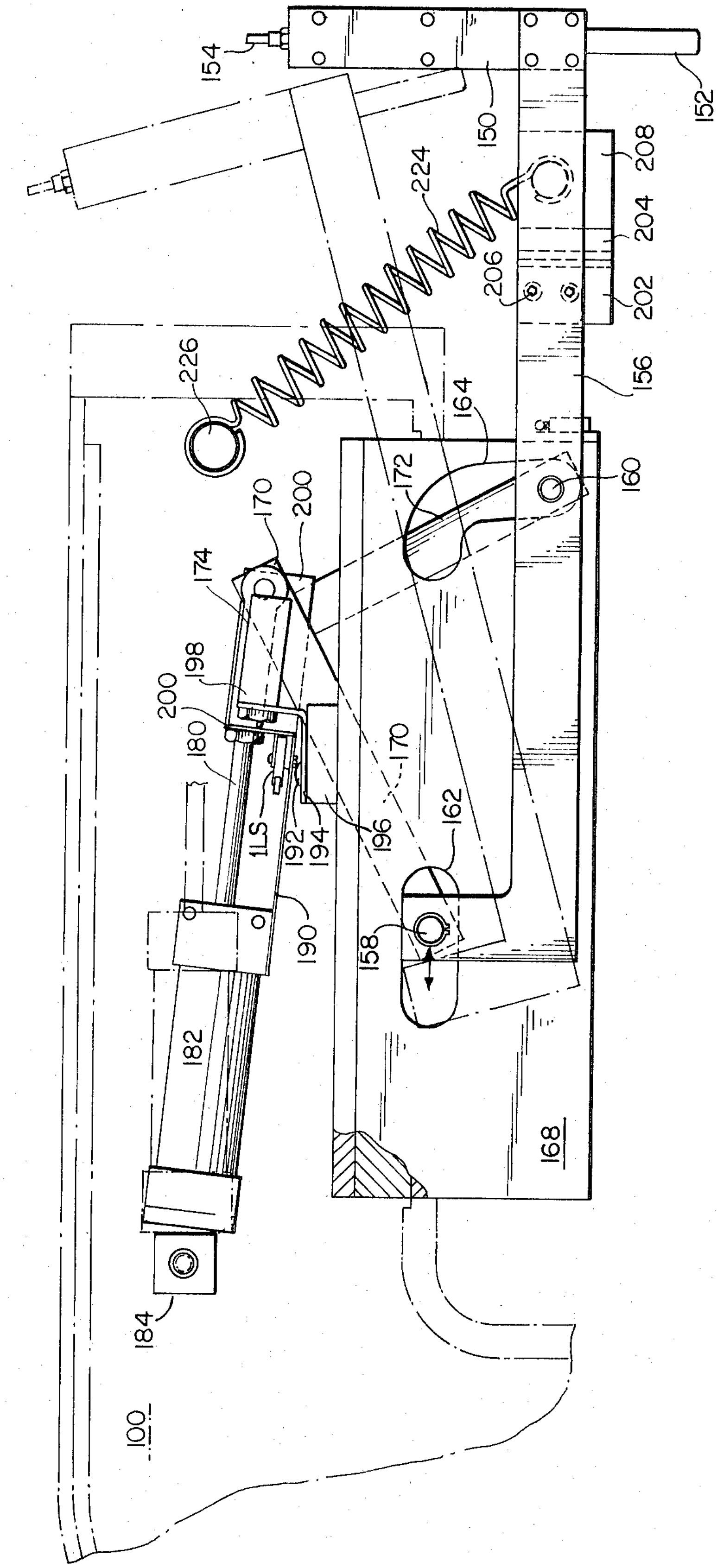
FIG. 6 is a left-side view of the component hold-down assembly.
Figures 7, 13, 14:
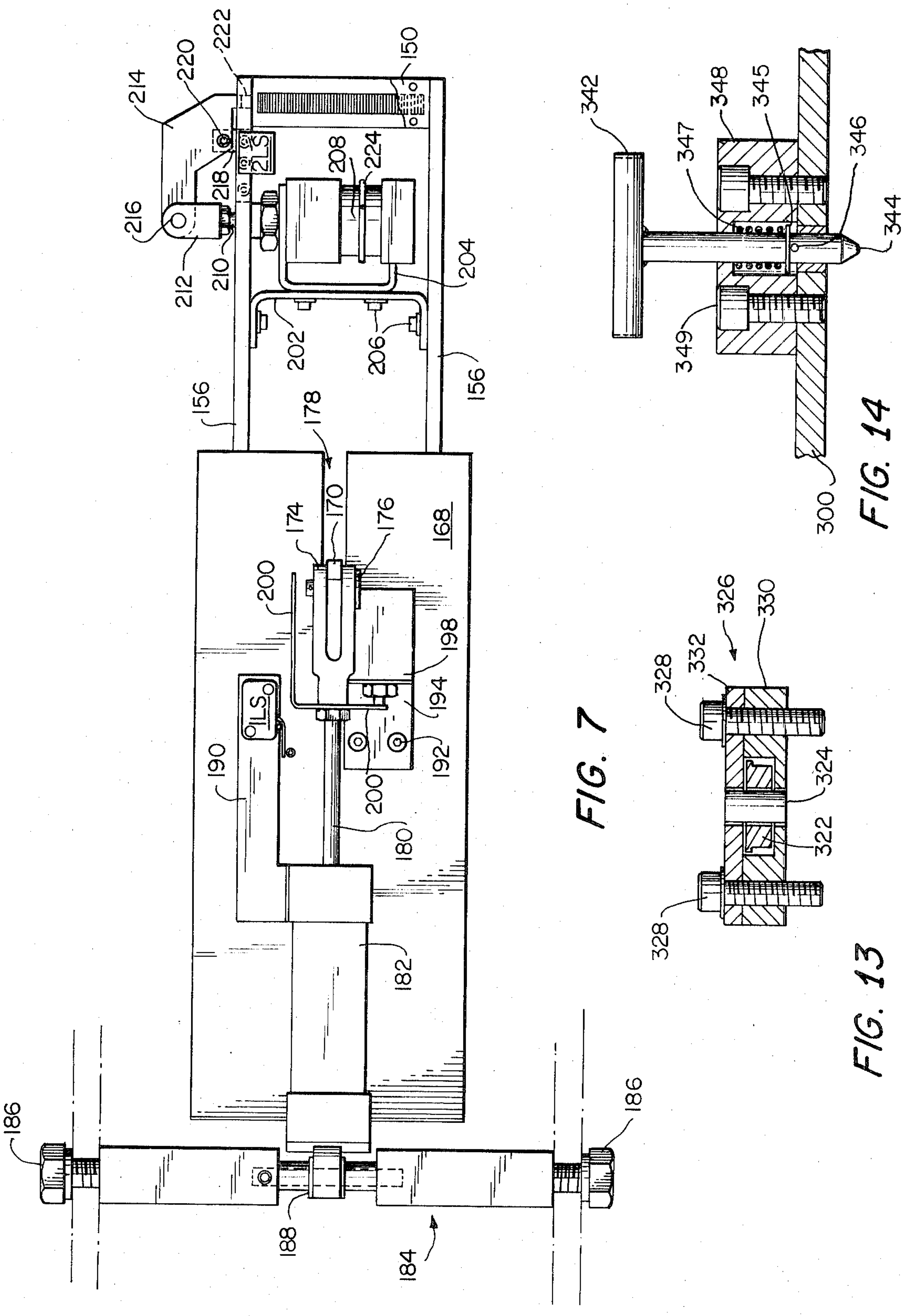
FIG. 7 is a top view of a component hold-down assembly.
FIG. 13 is a cutaway section taken along lines 13—13 of FIG. 11.
FIG. 14 is a sectional view taken along lines 14—14 of FIG. 11.

The support frame 100, shown in phantom in FIGS. 6 and 7, also supports the component hold-down assembly which keeps the component in position against the circuit board after manual insertion during the cut and clinch operation. The hold-down assembly is composed of an air chamber 150 having a plurality of thin metal leaves 152 under pneumatic pressure extending therefrom. The metallic leaves follow the contour of the component and prevent it from lifting off the workpiece when its leads are cut and clinched. The hold-down assembly is retracted during table movement. The air chamber 150, which has pneumatic port 154, is secured between two L-shaped brackets 156, which are joined by two pins 158 and 160. The pins move in apertures 162 and 164 of a guide frame 168, which is secured to the support frame 100.

A mechanical linkage, having two arms 170 and 172 at approximately right angles, is connected to pins 158 and 160. The other end of arm 170 is connected to a yoke 174 by a pin 176. The mechanical linkage extends from the interior of the guide frame 168 through a slot 178 to the yoke 174 which lies above the guide frame 168.

The yoke 174 is mounted on one end of piston rod 180 of pneumatic cylinder 182. A pin 184, secured at both ends by nuts 186 to the support frame 100, has cylinder 182 mounted thereto with a bushing 188. A limit switch ILS is mounted to an L-shaped support 190 which is attached to the cylinder 182. Mounted to guide frame 168 by fasteners 192, bracket 194 and block 196 is a combination stop-and-position sensor 198, which controls the activation of the leaves' clamping unit. An L-shaped arm 200 is mounted to piston rod 180 to control the operation of limit switch 1LS and sensor 198 is response to the movement of the piston rod 180.

A metal leaves clamping unit is mounted between brackets 156 by supports 202 and 204 and fasteners 206. A pneumatic cylinder 208 having a piston rod 210 and yoke 212 is mounted to support 204.

A locking bar 214 is pivotally connected to yoke 212 by pin 216 and to bracket 156 by support 218 and pin 220. An end portion of locking bar 214 extends into an air chamber 150 at aperture 222 so as to apply a lateral force on the metal leaves 152, thereby clamping them. A tension spring 224 is fastened between a pin 226 mounted to support frame 100 and the cylinder 208 to return the component hold-down assembly to its up position after the component has been cut and clinched. Also mounted to brackets 156 is limit switch 2LS, which senses the clamping position of locking bar 214.

The operation of the component hold-down assembly begins in the phantom position of FIG. 6. In this position, the piston 182 is deactivated with the piston rod 180 retracted and arm 200 closes limit switch 1LS. Sensor 198 is in the first state, which deactivates clamping cylinder 208. The pins 158 and 160 are at their left-most position in guide apertures 162 and 164, respectively. Cylinder 208 is deactivated, thereby unlocking or unclamping metal leaves 152 and opening limit switch 2LS. Tension spring 224 retains the air chamber 150 in the raised position. Upon a command from the controller, cylinder 182 is activated, extending rod 180 which causes pin 158 to move forward and pin 160 to move forward and down by guide apertures 162 and 164, respectively. The movement of piston rod 180 causes arm 200 to open limit switch 1LS.

When pins 158 and 160 move as described, brackets 156 move forward and down so as to bring the air chamber 154 and metal leaves 152 down, as shown in FIG. 6, on top of an electrical component manually inserted by the operator. At the end of the stroke of piston rod 180, arm 200 moves sensor 198 to its second state, which activates cylinder 208 to clamp or lock the metal leaves 152 and thereby prevent them from moving up. The movement of locking bar 214 closes limit switch 2LS, which transmits a signal to the central control that the component is ready to be cut and clinched. After the electrical component is cut and clinched, cylinders 108 and 208 are deactivated and spring 224 helps return the hold-down assembly to the phantom position.

POSITION AND ORIENTATION INDICATORS

The X–Y positioning system (which will be described in detail later) moves the work piece or circuit board so that the holes into which the next electrical component is to be inserted are approximately centered on the support frame 100 and the hold-down assembly and projector mounted thereon. One of a plurality of indicators are directed from the projector and focused on the work piece to indicate the location and orientation in which the component is to be inserted.

PROJECTOR UNIT

Figures 8, 9:
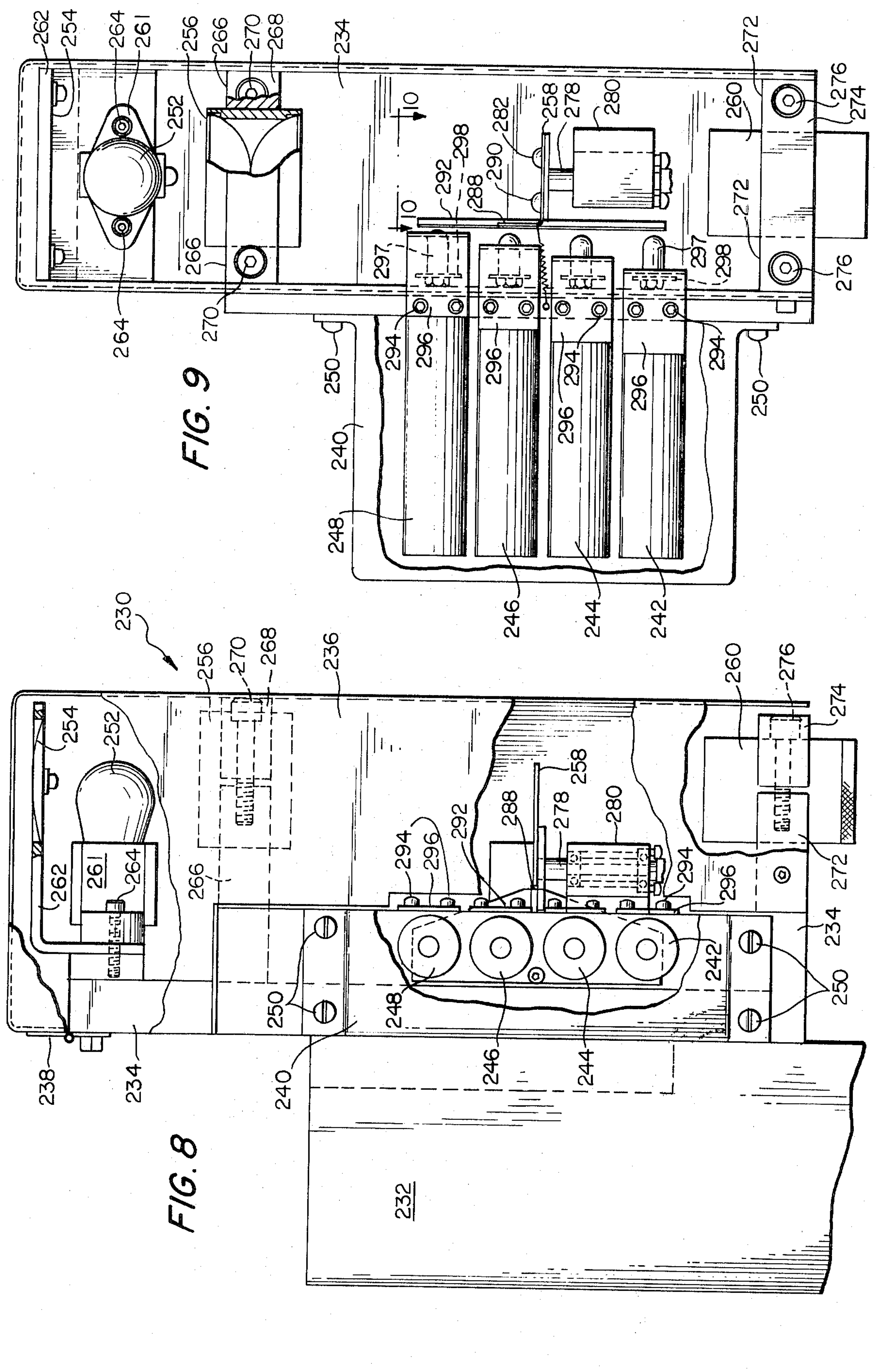
FIG. 8 is a left side view of a projection unit.
FIG. 9 is a front view of the projection unit with the front cover removed.
Figures 10, 11, 12:
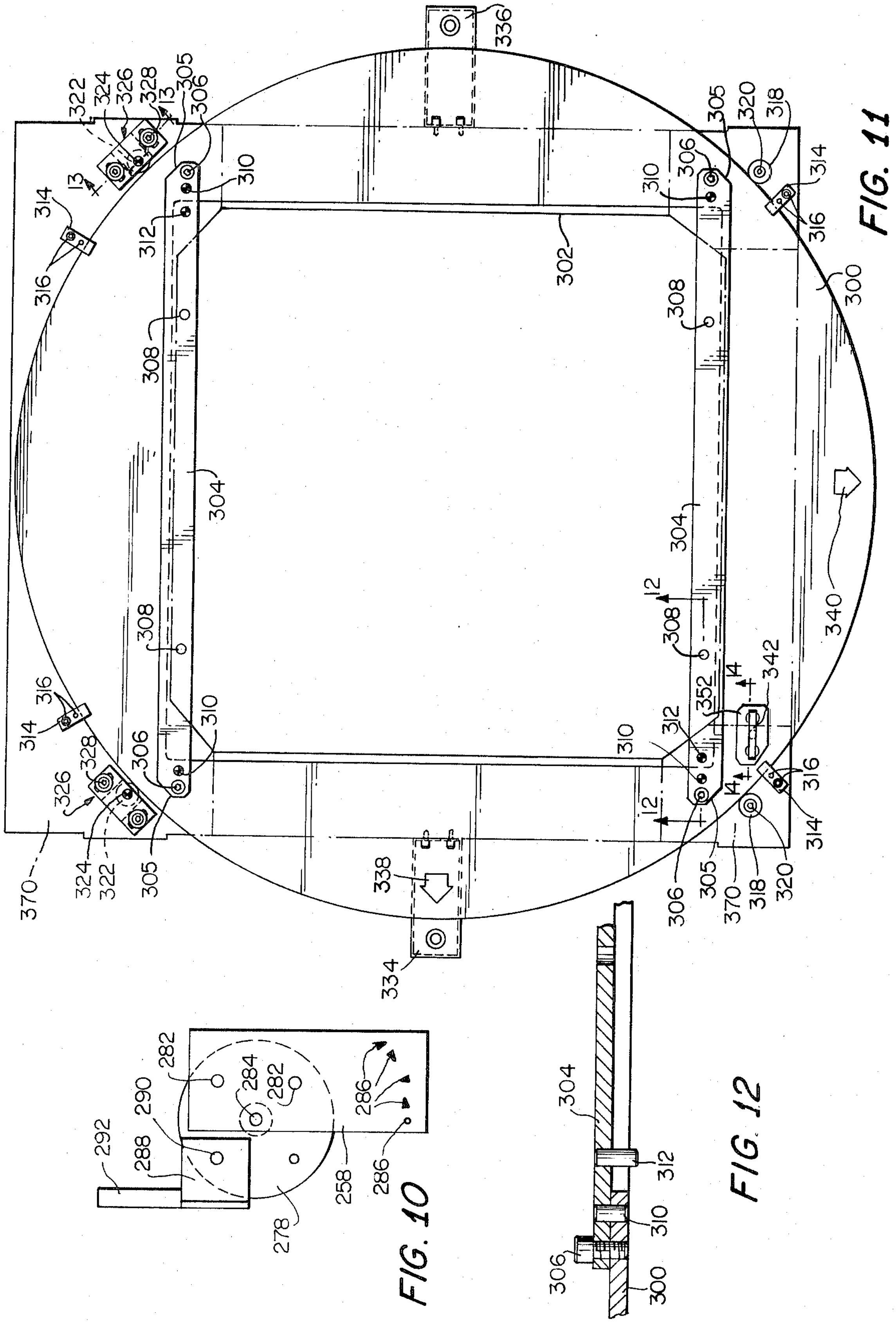
FIG. 10 is a top view of the hub and template taken along lines 10—10 of FIG. 9.
FIG. 11 is a top view of the rotatable work table.
FIG. 12 is a view taken along lines 12—12 of FIG. 11.

The projector unit 230 is shown in detail in FIGS. 8–10. It is mounted to an extension 232 of support frame 100 by a support 234. A housing cover 236 for the projector is pivotally mounted on a support 234 by hinge 238 and a housing 240 for the actuator 242, 244, 246 and 248 is fastened to support 234 by fasteners 250.

The optical system of the projector unit includes a light source or lamp 252, a reflector 254, a lens 256, a template 258 and a lens 260. The lamp 252 is received in a socket 261 which is mounted with reflector bracket 262 to support 234 by fasteners 264. Lens 256 is mounted to support 234 by a pair of brackets 266, a cross brace 268 and fasteners 270. Lens 260 is held by brackets 272, cross brace 274 and fasteners 276 which are mounted to support 234. The light from source 252 is reflected from a reflector 254 and transmitted directly from source 252 to lens 256 which focuses the light at template 258. The light is transmitted through one of the selected apertures in template 258 to lens 260 which magnifies and focuses the transmitted light onto the workpiece.

The subassembly for selecting the appropriate aperture on template 258 includes a hub 278 rotatably received in bracket 280 which is mounted to support 234. The template 258, as shown in FIG. 10, is mounted to hub 278 by fastener 282 and aligned by pin 284 extending up from the center of hub 278. Five apertures 286 (a circle and four arrowheads pointing in directions 90° apart) are formed in template 258 and lie on an arc having its center at pin 284 which is the center of the hub and the axis of rotation. Also mounted to hub 278 by an "L" bracket 288 and fastener 290 is an arm 292 which is positioned adjacent the actuators 242, 244, 246 and 248.

Mounted to support 234 by fasteners 294 are four L-shaped stops 296, one for each actuator. Extending from each actuator through stops 296 is a finger 297. A ring 298 is attached to each finger 297 and cooperates with stops 296 to limit the displacement of fingers 297. The stops 296 are mounted such that the displacement of the fingers increase with the finger of actuator 242, having the smallest displacement and the finger of actuator 248, having the largest displacement. The actuators are internally spring biased to return to a zero displacement when deactivated. The actuators are pneumatic but solenoids may also be used.

When one of the actuators (242, 244, 246 or 248) is activated, its finger 297 is extended to come in contact with and move arm 292. The movement of arm 292 produces a rotation of hub 278. This rotation places one of the apertures 286 on the optical axis of lens 256. The image of the selected aperture 286 is projected through lens 260 onto the workpiece. The hub is spring biased (not shown) so as to return to a home or starting position. Each actuator will position template 258 to display one of the arrowheads 286. The circle 286 is displayed when none of the actuators are activated.

The indicia projected onto the workpiece locates the left aperture in the position workpiece into which the electrical component is to be manually inserted. The circle 286 could indicate that the electrical component may be inserted with any orientation between the indicia aperture and the next aperture to the right. The arrowheads 286 could indicate the polarity or orientation that a diode should be inserted or the arrowheads may correspond in direction to a particular marking on the electrical component to indicate insertion orientation. Though four actuators are shown, obviously only two would be needed for most two electrode electronic components.

ROTATING WORK TABLE

Supported by the X–Y positioning system, as illustrated in FIG. 11, is a rotating work table which holds the workpiece and positions it in one of two positions, i.e. 0° and 90°. The work table 300 is generally circular with a rectangular opening 302 in the center. Along opposite sides of the opening 302 are removable, secured plates 304 which are used to clamp a work holder to the rotatable work table. The work holder supports and secures the work piece or circuit board for positioning by the X–Y positioning system and the rotatable work table. The outside fasteners 306 secure the plates 304 to the work table 300 and inside fasteners 308 secure the work holder to the plates 304. Pins 310 mounted to plates 304 align the plates 304 and the work table 300 and pins 312, also mounted to plates 304, align the plates 304 and the work holder. As can be seen in FIG. 12, pins 312 must be long enough to extend past the table 300 to insure proper engagement with the work holder.

The work table 300 rests on the X carriage 370 and is prevented from vertical movement by L-shaped clips 314 which are secured to the X carriage by fasteners 316. It should be noted that plates 304 have their exterior corners 305 cut on a diagonal so as not to collide with the clips 314 when the work table is rotated. At the operator's side of the work table (the bottom of FIG. 11) are two rollers 318 mounted to the X carriage by pins 320 and at the opposite side of the work table are two rollers 322 mounted on pins 324 in housings 326 which are secured to the X carriage by fasteners 328. As shown in FIG. 13, the housing 326 has a base 330 and a top 332.

Mounted to the X carriage 180° apart are table orientation indicators 334 and 336. The indicators have two different color light bulbs or lenses, which correspond in color to indicia 338 and 340, respectively. The indicia are mounted on the rotatable work table 90° apart. For example, indicator 334 and indicia 338 may be white, and indicator 336 and indicia 340 may be red.

To aid in the rotation of the work table and to lock it in place after rotating, a handle 342 is provided. As shown in FIG. 14, the handle 342 is T-shaped and has a tapered end 344 for insertion into a 0° and 90° aperture (not shown) in the X carriage, thereby preventing the work table from further rotational movement. The handle has a flange 345 resting against pin 346 which receives one end of compressional spring 347. The other end of the spring 347 is in contact with a housing 348 which is mounted to the work table 300 by fasteners 349. The spring 350 exerts sufficient force to maintain the handle 342 in either 0° or 90° apertures in the X carriage, but the force may be overcome by the operator when lifting the handle 342.

When the present machine is first turned on, the desired position of the table (0° or 90°) is indicated by the controls activating either indicator 334 or 336. If the indicia 338 or 340 is adjacent the desired indicator, the work table is properly positioned for the component insertion. If there is no indicia adjacent the activated indicator, the operator must unlock the table by raising handle 342 and moving the table 90° to align the appropriately colored indicia with the corresponding color activated indicator. The operator then releases the handle, which will lock the work tables. Normally the indicators 338 or 340 will not be activated again unless the next component to be inserted is to be 90° from the previous component. Thus, the indicator will only attract the operator's attention when the table must be rotated. By providing the capacity to rotate the work table (thus the work piece), electrical components may be manually inserted, cut and clinched in orthogonal directions on the workpiece, as required by most circuit boards in order to increase the number of components on a board.

X–Y POSITIONING SYSTEM

The X–Y positioning system provides the means for accurately positioning the workpiece in the correct relationship to the hold-down assembly, the projector and the cut and clinch assembly for proper component lead processing. It consists of two interacting tables, drive motors, precision lead screws, position encoders, and rotary worktable assembly as previously described.

Figure 2:
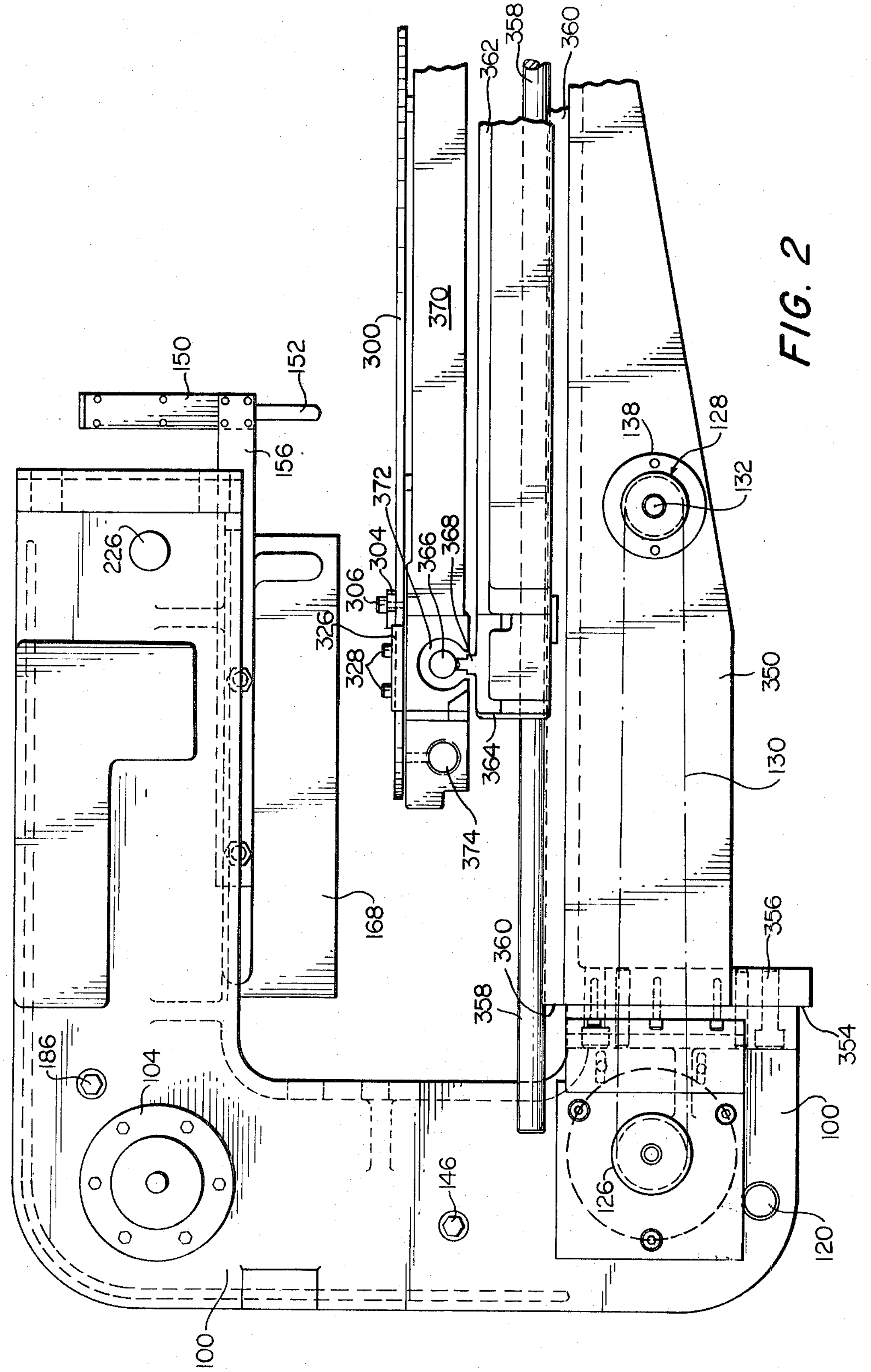
FIG. 2 is a left-side view of the support frames and assemblies secured thereto.

As illustrated in FIGS. 1 and 2, an X–Y positioning support 350 which is generally wedge-shaped is mounted to the console table top 54. Surface 352 is inclined from the horizontal by approximately 10°. The slight incline has been found to increase the accessability of the work piece to the operator for the manual insertion of components. Mounted to rear surface 354 of support 350 by fastener 356 is support frame 100.

A pair of rods 358 are secured to support 350 on rails 360. The Y axis carriage 362 moves along the rods 358 on bushings 364. Similarly, the Y carriage has a pair of rods 366 secured thereto on rails 368. The X axis carriage 370 moves along the rods 366 on bushings 372. As described earlier, the X-carriage supports the rotary work table 300. A threaded aperture 374 for the X axis 370's lead screw (not shown) is shown in FIG. 2.

The X and Y carriages are driven by printed circuit motors through a precision lead screw. Constant position monitoring is accomplished by photosensitive rotary encoders. The drive motors are controlled by a servo system as disclosed in U.S. Pat. No. 3,739,158, which is assigned to the same assignee as the present patent and is incorporated herein by reference.

CUT AND CLINCH ASSEMBLY

The cut and clinch assembly processes the component leads after they have been manually inserted into the workpiece. This assembly is centered beneath the X–Y table and directly beneath the component hold-down device.

Figure 15:
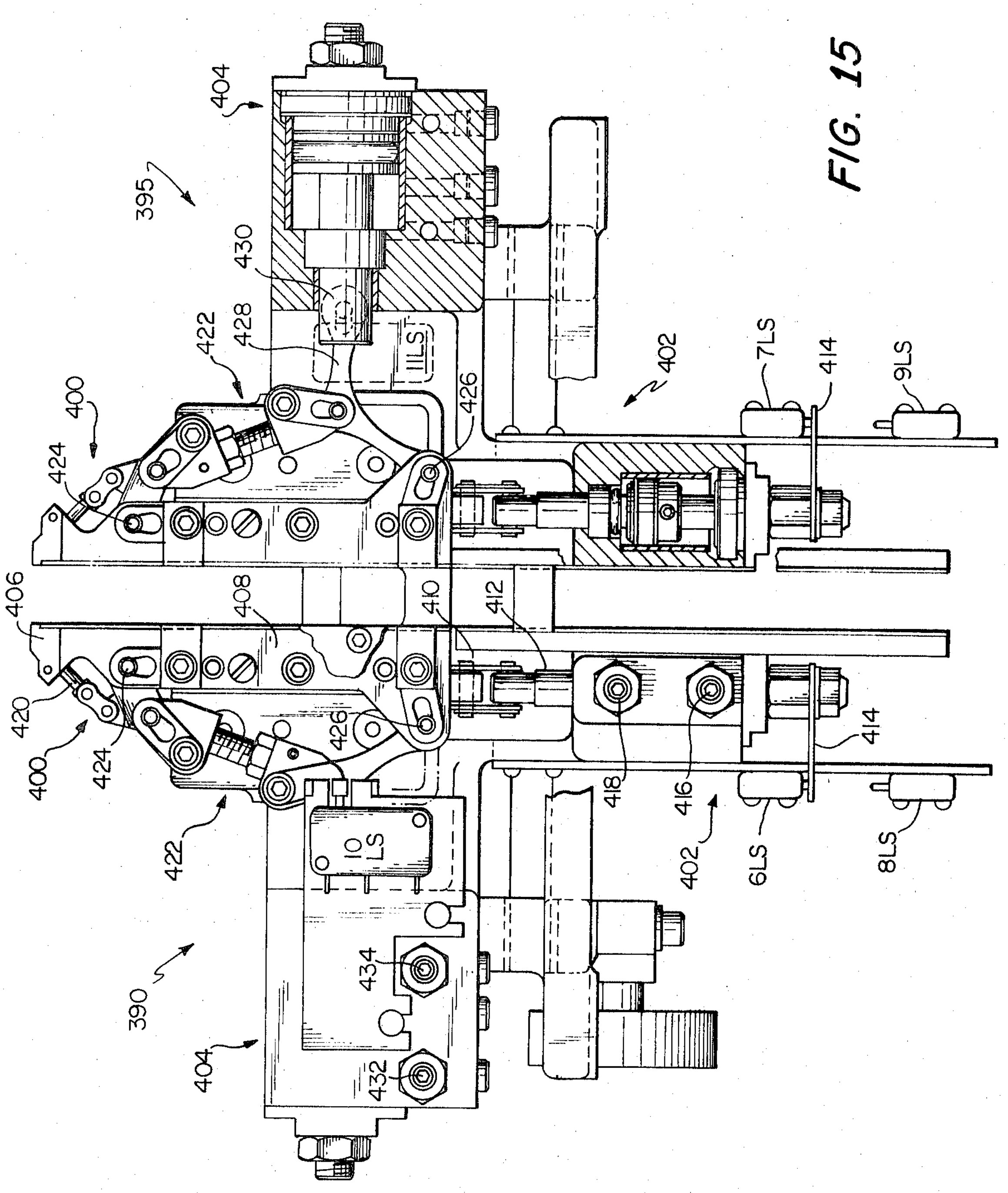
FIG. 15 is a front view of the cut and clinch mechanisms with sections cut away.

The cut and clinch assembly, having two approximately symmetrical halves 390 and 395, receives a signal from the control which informs it of the lead spacing. The right half 395, as viewed by the operator and illustrated in FIG. 15, is moved either closer or further apart from the fixed left half 390, dependent upon the lead spacing of the present component as compared with the lead center distance of the component previously inserted. The clinch and cut assembly as a whole does not move since the workpiece moves on the X–Y positioning device to a point where the middle of the distance between the lead holes is aligned with the half-way point between the two symmetrical halves of the assembly.

Figure 17:
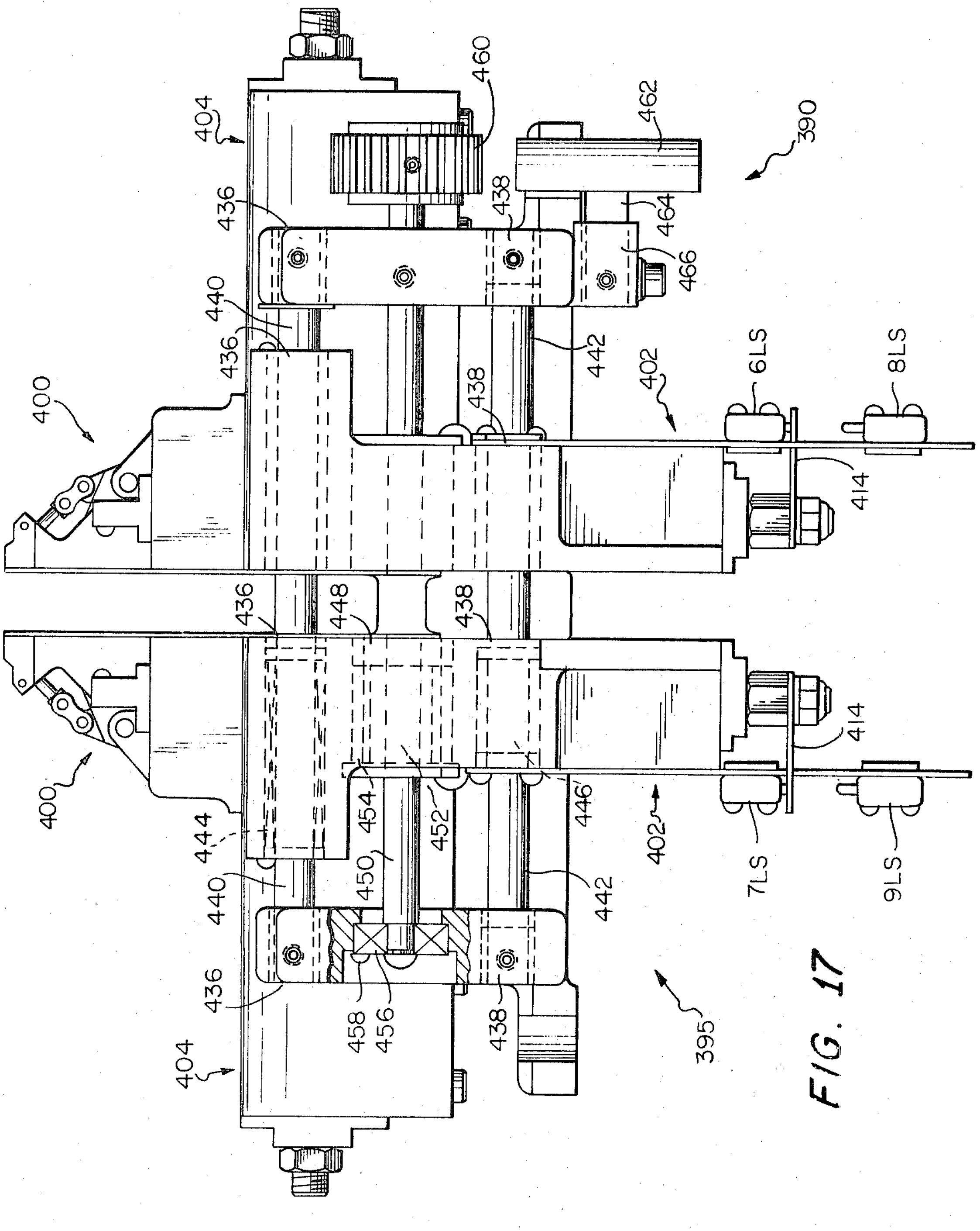
FIG. 17 is a rear view of the cut and clinch assembly with portions cut away.

The cut and clinch assembly rises by the action of a pneumatic cylinder designated generally as 402 until the component leads enter the severing and anvil assembly, designated generally as 400 in FIGS. 15–17. The cutting pneumatic cylinder 404 then is activated and the leads are severed. The cut and clinch assembly then moved down by the action of cylinder 402 and the cutter retracts by the action of cylinder 404.

The anvil section 406 of the cut and clinch assembly moves relative to and in a guide section 408 driven by linkage 410 which is pinned to piston rod 412 of cylinder 402. An arm 414 is connected to the other end of piston rod 412 to move between the limit switches 6LS and 8LS for the left half 390 of the assembly, and between 7LS and 9LS for the right half 395 of the assembly. The limit switches transmit signals to the central control which indicate whether the anvil is raised for a cut and clinch or lowered in a hold position so that the X–Y assembly and rotary work table may be moved. The position of piston rod 412 is determined by air supply to the appropriate port 416 or 418 of cylinder 402.

Cutting and clinching rod 420 rides in anvil section 406 to sever the ends of the electrical component and to bend or clinch the component to the bottom of the work piece. The rod 420 is driven by a combination of linkages 422 which are pinned to the anvil assembly at 424 and to the stationary guide 408 at 426. A link 428 connects piston rod 430 of pneumatic cylinder 404 to the linkage drive assembly 422 for rod 420. The position of piston 430 of cylinder 404 is determined by the air pressure at ports 432 and 434. Limit switches 10LS and 11LS for the left and right symmetrical halves, respectively, sense the forward motion or cut and clinch position of cylinder 404 and transmit this information back to the central control.

The left half 390 of the cut and clinch assembly is generally identical to the right half 395 of the assembly, except for mechanisms needed to move the right half 395 relative to the fixed left half 390. As specifically shown in FIG. 17 (note: since this is a back view, the right half, as viewed, is the named left half 390 and the viewed left half is the named right half 395), each half has two smooth bores 436 and 438 in which is received and secured to transverse rods 440 and 442. Bores 436 and 438 of the right half 395 have bearing inserts such as 444 and 446, and allow the right symmetrical assembly 395 to slide along rods 440 and 442 towards and away from the left assembly 390 to accommodate varying distances between component leads.

Located between bores 436 and 438 is another larger bore 448. The purpose of this bore is to accommodate either a shaft 450, in which case it is smooth in both halves, or a screw, in which case it is internally threaded in the right half 395. If it is threaded, the threaded shaft 450 will be driven so that the cut and clinch assembly can accommodate an infinite number of different lead spacings on the components, i.e., variable center distance between the parallel portions of the leads. If only two center distances between leads are used, then stops are used in conjunction with a smooth shaft so that the two symmetrical cut and clinch assemblies are always separated by one of two known distances.

As illustrated, the shaft 450 has a thread sleeve 452 and one of the bores 448 of the right half 395 is also threaded at 454. The right end of shaft 450 is received in bushing 456 which is maintained in place by locking washers 458. A gear 460 is mounted on the left end of shaft 450 and receives a belt (not shown) which is driven by gear 140 (FIG. 21). An idler roller 462 is mounted to the left half 390 by a shaft 454 and bracket 466.

The brief description of the cut and clinch assembly is included herewith so as to further the understanding of the operation of the present invention. For a more complete explanation of the disclosed cut and clinch assembly, reference is made to U.S. Pat. No. 3,646,659, assigned to the assignee of the present invention and incorporated herein by reference. It should be noted that though this patent and FIGS. 15 and 17 (as disclosed herein) show an inward cut and clinch mechanism, the outward cut and clinch mechanism of U.S. Pat. No. 3,724,055 also incorporated herein by reference and assigned to the same assignee, may be used.

BIN ASSEMBLY

Figure 3:
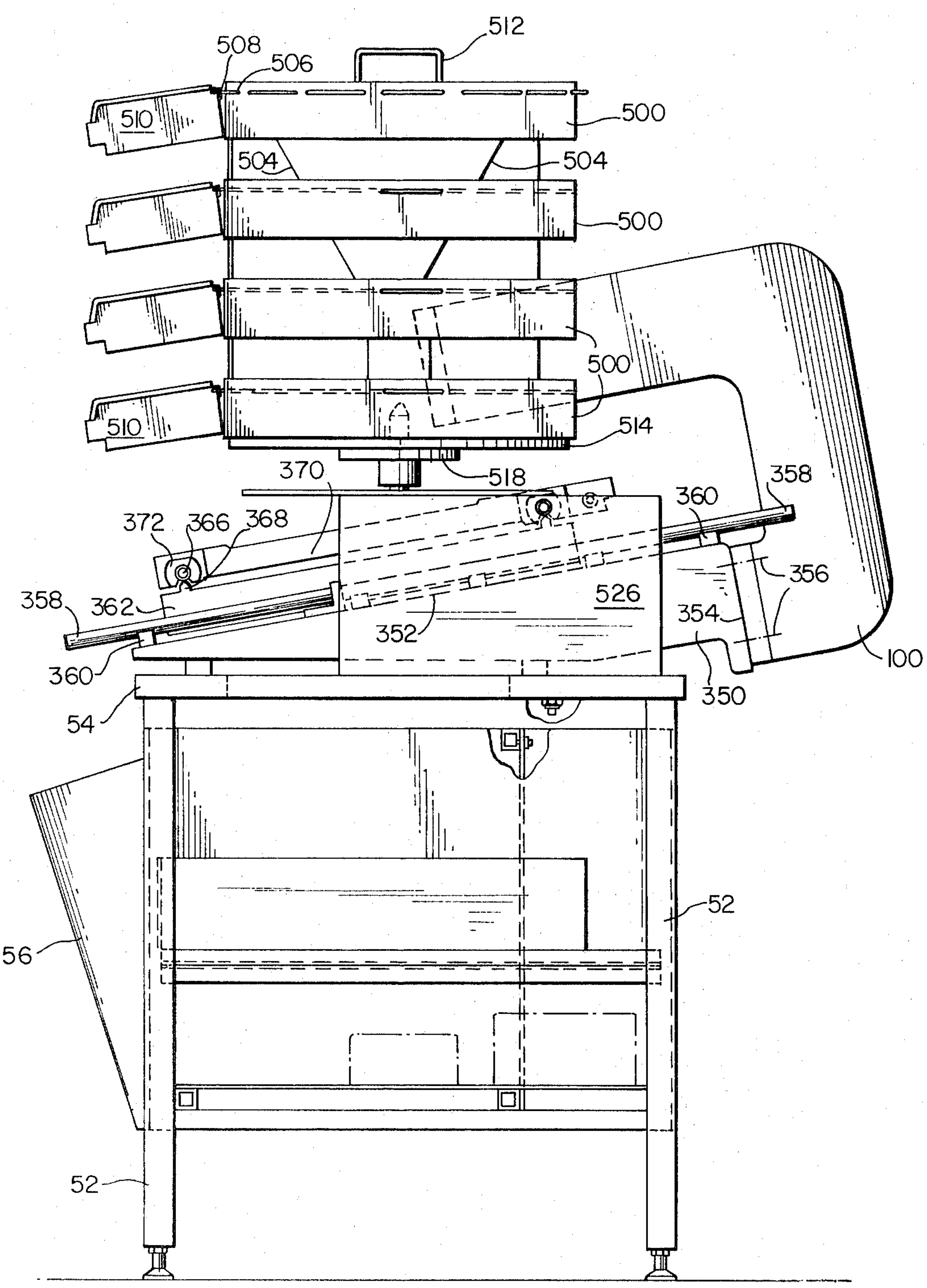
FIG. 3 is a right-side view of a preferred embodiment of the present invention.
Figure 19:
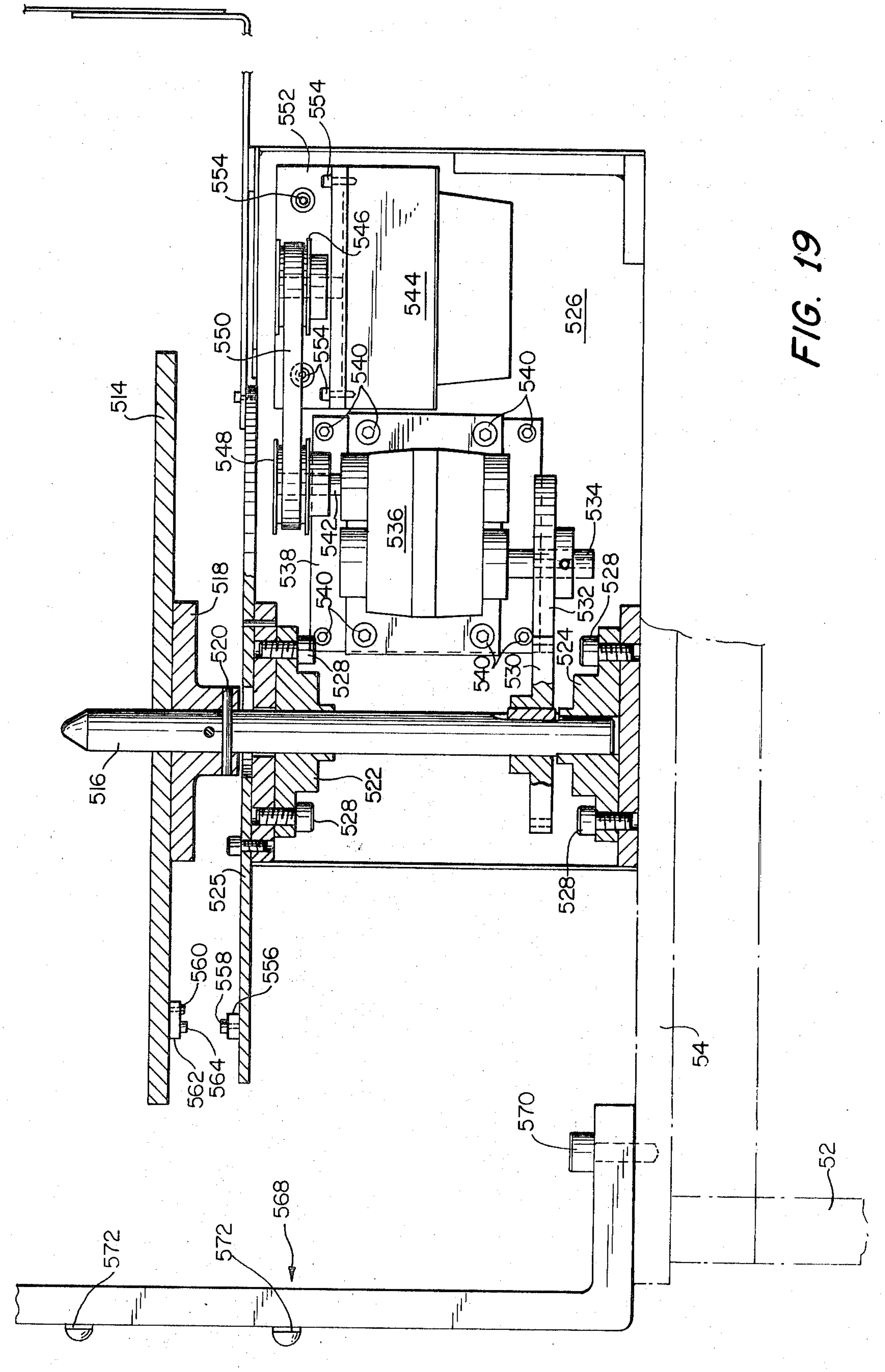
FIG. 19 is a right-side view of the component bin drive assembly.

The bin assembly, as illustrated in FIGS. 3, 18 and 19, is a four tier carousel having the individual tiers 500 secured to a center support shaft 502 by five spokes 504. Around the periphery of each tier 500 are fifteen brackets 506 which receive U-shaped hooks 508 mounted to the rear of part bins 510. The number of tiers and bins on the tiers are only examples, thus they may be varied to meet desired design requirements. The disclosed numbers provide 60 separate bins from which electrical components may be chosen for manual insertion. By using bracket 506 and hooks 508, the individual bins may be replaced with a bin supplied with the same components or different components without using any tools. Also, a handle 512 and a hook 513 is provided at the top of the carousel so that the whole carousel may be replaced with another carousel with a different arrangement of bins and components therein for a different job. It should be noted, however, that with the 60 bins and the computer's knowledge of their location and contents, the machine may be programmed for most jobs without replacing the carousel or rearranging or replacing any of the bins 510.

The lowest tier of the carousel rests on a rotating platform 514 which is secured to a drive shaft 516 by a member 518 and pin 520. A pin 521 (shown in FIG. 18) protruding from the carousel is received in a slot (not shown) in the platform 514. The pin 521 indexes the carousel relative to the rotating platform 514. The drive shaft 516 is journalled between two brackets 522 and 524 which are secured to the table top 54 and to the top of bin drive housing 526 by fasteners 528. Mounted on the lower end of drive shaft 516 is gear 530 which is driven by gear 532 mounted to the output shaft 534 of transmission 536. The transmission 536 is mounted to the sides of bin drive housing 526 by bracket 538 and fasteners 540. The input shaft 542 of transmission 536 is driven by motor 544 through pulleys 546 and 548 and belt 550. The motor 544 is mounted to the side wall of the bin drive housing 526 by a bracket 552 and fasteners 554.

The top 525 of bin drive housing 526 is circular and has mounted thereto fifteen reed switches 556 by fastener 558. The reed switches are equidistant and correspond to the number of bins peer tier. Secured to the bottom of platform 514 by fasteners 560 and brackets 562 is a magnet 564. A tier indicator 568 is mounted to the table top by fastener 570 and includes four lights 572 which indicate the tier a component is to be selected from.

The bin assembly is under the control of the computer which rotates the carousel by selective operations of transmission 536 until the desired bin is adjacent tier indicator 568. The computer senses the proper location when magnet 564 is adjacent the appropriate reed switch 556. Once the carousel has stopped, one of the four tier lights 572 is activated by the computer to indicate which tier and therefore in which bin, the next part to manually inserted is located.

PNEUMATIC CONTROL CIRCUIT

Figure 20:
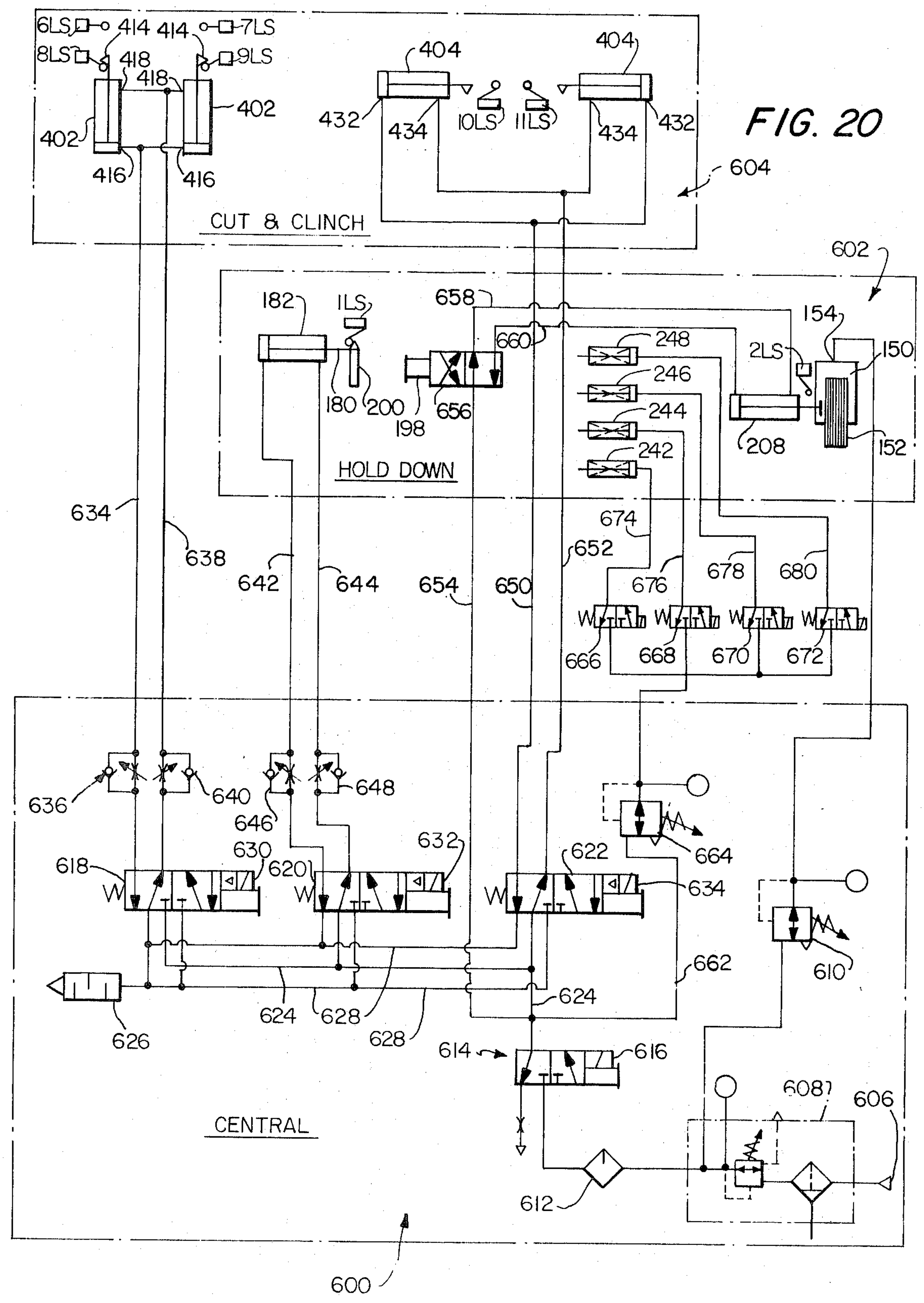
FIG. 20 is a schematic of the pneumatic circuit and controls.

The pneumatic controls as illustrated in FIG. 20 are subdivided into three-basic units in three locations, i.e., the central pneumatic control 600, the component hold-down control 602; and the cut and clinch control 604.

Pressurized air is introduced into the pneumatic control section 600 at 606 and passes through a filter regulator 608 and continues to a regulator 610 which reduces the air pressure. The air chamber 150 of the component hold-down assembly is connected to regulator 610 through port 154. Also connected to filter regulator 608 through a lubricator 612 is a three-way valve 614. Solenoid 616 operates valve 614.

Three five-way valves 618, 620, 622 are connected to valve 614 by line 624. A speed control muffler 626 is connected to two ports each of valves 618, 620, 622 via line 628. The valves 618, 620, 622 are controlled by solenoids 630, 632 and 634, respectively. Valve 618 is connected to port 416 of anvil cylinders 402 by lines 634 and flow control valve 636 and to port 418 by lines 638 and flow control valve 640. Valve 620 is connected to component hold-down cylinder 182 via lines 642, 644 and flow control valves 646 and 648. Valve 622 is connected to clinch port 432 and 434 of clinch cylinders 404 by lines 650 and 652, respectively.

The metal leaves lock cylinder 208 is connected to valve 614 via line 654, four-way valve 656 and lines 658, 660. Valve 656 is controlled by arm 200 of hold-down cylinders piston rod 180 interacting with valve element 192. Cylinders of projector actuators 242, 244, 246 and 248 are connected to cylinders 614 via line 662, regulator 664, three-way valves 666, 668, 670, 672 and lines 674, 676, 678, 680, respectively.

ASSEMBLY MACHINE OPERATION

Assuming that the machine has been in operation, the workpiece is moved so that the left aperture in the workpiece, into which the next electrical component is to be manually inserted, is below the optical axis of projector 230 and above the left half 290 of the cut and clinch assembly. If the next electrical component is to be inserted parallel to the previously inserted electrical component, the operator selects a component from the appropriate bin 510 which will be adjacent to the activated indicator 572. The carousel is rotated during the X–Y positioning of the workpiece so as to provide a single column of bins 510 adjacent to the indicators 572. If this next electrical component is to be inserted in a plane perpendicular to the previously inserted electrical component, the indicator 334 or 336 will be activated to notify the operator that he must reposition the rotatable work table 300, using handle 342 to rotate the table 90°. Once he has rotated the table 300, he may select the appropriate electrical component from bin 510 as previously discussed.

The left aperture in the workpiece, into which the electrical component is to be inserted, is indicated by a circle or one of the four arrows produced by the apertures 286 and template 258. The appropriate projected image is selected by activation of one or none of the pneumatic actuators 242, 244, 246 or 248. The electrical component is manually inserted in the pair of apertures in the work piece with the left lead in the illuminated aperture and the component oriented as indicated by the indicia arrows projected thereon.

After the component has been inserted in the location with the proper orientation, a foot switch (not shown) is depressed by the operator. The hold-down assembly is moved forward with air cylinder 150 and leaves 152 holding the component firmly secured to the workpiece. Once the controller senses that the hold-down assembly is in place, the cut and clinch assembly is raised and cuts and clinches the component leads. After the leads are cut and clinched, the cut and clinch assembly is lowered and the hold-down assembly is raised to allow the workpiece to be repositioned to the next position. Thus, the cycle just described is repeated, starting with the positioning and selection of components.

The present machine is designed for manual insertion of electronic components whose leads extend from the lateral sides or axially extend, and are bent to have L-shaped leads which extend into the apertures in a work piece. Because these leads extend from the sides of the component, the component cannot be manually held during cut and clinch to prevent movement of the leads. Thus, the inclusion of the hold-down assembly is needed. A typical example of an axial lead component is a resistor. Though the resistor generally has two leads, multiple axial leads may also be pressed by the present machine. For example, a dip module may be inserted in the indicated position. The controls would be programmed such that the cut and clinch assembly will raise and cut the first pair of leads, be lowered and the table moved in the Y position, the cut and clinch assembly raised to cut and clinch the next pair of leads, and so on and so forth, without the requirement of raising the component hold-down assembly and/or reindication of the position orientation and bin from which the next part is to be selected.

Thus, the present assembly machine provides automatic positioning of the workpiece, indication of location and orientation of components to be inserted, location of source of component, hold-down assembly and cutting and clinching mechanisms for the manually inserted electrical component. The present apparatus provides the ability for cutting and clinching multiple pairs of axial leads for a single component.

Although the invention has been described and illustrated in detail, it is to be clearly understood that the same is by way of illustration and example only and is not to be taken by way of limitation. The spirit and scope of the present invention are limited only by the terms of the appended claims.

What is claimed is:

1. A machine for processing electrical components whose leads are to be manually inserted through a work piece disposed in a plane comprising:

means for positioning said work piece in said plane;

means for indicating a location on said work piece at which said component's leads are to be inserted;

means for indicating the supply source of the component to be inserted;

means for holding said inserted component on said work piece;

means for cutting and clinching said component's leads; and control means operable to actuate said positioning means, said location indicating means and said supply indicating means, whereby the source and location of the component to be manually inserted on the positioned board is indicated.

2. A machine as in claim 1 wherein said positioning means includes motor means to move said workpiece in two orthogonal directions in said plane, and means for allowing said workpiece to be rotated in said plane.

3. A machine as in claim 2 wherein said rotatable means includes a rotatable work holder, indicia on said rotatable work holder, means stationary relative to said rotatable work holder for indicating desired rotated position of said rotatable work holder.

4. A machine as in claim 3 wherein said indicator means indicates two rotary positions 90° apart and said control means activates said indicator means when the orientation of the component to be inserted is 90° from the orientation of the previously inserted component.

5. A machine as in claim 1 wherein said location indicating means also indicates orientation of said component to be inserted.

6. A machine as in claim 5 wherein said location indicating means includes a light source, means for producing an image which indicates said position and orientation and means for projecting said image onto said workpiece.

7. A machine as in claim 6 wherein said image producing means includes a template with a plurality of apertures thereon and means for positioning said template relative to said light sources and said projecting means so that only one of said apertures is projected onto said workpiece at a time.

8. A machine as in claim 1 including a plurality of supply sources, means for rotating said supply sources relative to supply indicating means, and said control means causes said rotating means to position a supply source, from which the component to be manually inserted is obtained, adjacent said supply indicating means.

9. A machine as in claim 8 wherein said plurality of supply sources are positioned on a plurality of tiers, said supply indicating means includes one indicator per tier; said control means activates one of said tier indicators to indicate which supply source adjacent said supply indicating means the component to be inserted is to be obtained from.

10. A machine as in claim 1 wherein said cut and clinch means includes a first and second cut and clinch means and means for varying the spacing of said first and second cut and clinch means.

11. A machine as in claim 10 wherein said first cut and clinch means is stationary and said second cut and clinch means is moved relative to said first cut and clinch means by said spacing variation means.

12. A machine as in claim 11 wherein said location indicating means includes means for projecting an image on the work piece only above said first cut and clinch means.

13. A machine for processing electrical components whose leads are to be manually inserted through a circuit board comprising:

means for indicating a location on said circuit board at which said leads are to be manually inserted;

means for cutting and clinching said leads;

means for holding said inserted component against said circuit board during cutting and clinching; and means for positioning said circuit board relative to said cut and clinch means.

14. A machine as in claim 13 wherein said positioning means includes means for automatically moving said circuit board in two orthagonal directions and means rotatably mounted to said automatic moving means for holding said circuit board for rotation in a plane defined by said orthagonal directions.

15. A machine as in claim 14 wherein said plane is inclined relative to horizontal.

16. A machine for processing electrical components whose leads are to be manually inserted through a circuit board comprising:

means for positioning said circuit board relative to a fixed point;

means for indicating at said fixed point orientation of said electrical component to be inserted;

a pair of means for cutting and clinching said leads with one of said cutting and clinching means fixed at said fixed point; and means for holding said inserted component against said circuit board during cutting and clinching.

17. A machine as in claim 16 including means for moving the other of said cutting and clinching means relative to said fixed point.

18. A machine for processing electrical components whose leads are to be manually inserted through a circuit board comprising:

means for positioning said circuit board relative to a fixed point;

means for cutting and clinching said leads;

means for holding said manually inserted component against said circuit board during cutting and clinching; and means for indicating the location of said circuit board of said fixed point and indicating the orientation of said electrical component relative to said fixed point.

19. A machine as in claim 18 wherein said indicating means includes a light source, means for producing an image which indicates said position and orientation and means for projecting said image onto said circuit board.

20. A machine as in claim 19 wherein said image producing means includes a template with a plurality of apertures thereon and means for positioning said template relative to said light sources and said projecting means so that only one of said apertures is projected onto said circuit board at a time.

21. A machine as in claim 20 wherein said template positioning means includes means for supporting said template for rotation in a plane parallel to the plane of said circuit board, and a plurality of actuator means for rotating said support means to select projected apertures.

22. A machine as in claim 21 wherein the number of said actuator means is one less than the number of apertures in said template.

* * * * *